United States Patent [19]
Braun et al.

[11] Patent Number: 6,144,913
[45] Date of Patent: Nov. 7, 2000

[54] METHOD FOR CONTROLLING THE OUTPUT POWER OF AN INTERNAL COMBUSTION ENGINE

[75] Inventors: Hans Braun, Stuttgart; Thomas Brock, Ottobrunn; Bernd Danner, Aichtal; Wolfgang Hinrichs, Filderstadt; Thomas Klaiber, Weinstadt; Torsten Kroeger, Stuttgart; Alf Lehner, Ostfildern, all of Germany

[73] Assignee: DaimlerChrysler AG, Stuttgart, Germany

[21] Appl. No.: 09/239,684

[22] Filed: Jan. 29, 1999

[30] Foreign Application Priority Data

Jan. 29, 1998 [DE] Germany ............ 198 03 387

[51] Int. Cl.⁷ ............................................ F02D 43/00
[52] U.S. Cl. .................. 701/102; 701/101; 701/110; 123/352; 123/436; 180/197
[58] Field of Search ............... 701/102, 104, 701/101, 110; 180/197; 123/350, 352, 435, 436

[56] References Cited

U.S. PATENT DOCUMENTS

| | | | |
|---|---|---|---|
| 5,150,635 | 9/1992 | Minowa et al. | 477/43 |
| 5,245,966 | 9/1993 | Zhang et al. | 123/350 |
| 5,558,178 | 9/1996 | Hess et al. | 701/101 |
| 5,645,033 | 7/1997 | Person et al. | 123/399 |
| 5,657,230 | 8/1997 | Hess et al. | 701/104 |
| 5,692,472 | 12/1997 | Bederna et al. | 123/350 |
| 5,713,428 | 2/1998 | Linden et al. | 180/179 |
| 5,961,566 | 10/1999 | Heslop | 180/179 |

OTHER PUBLICATIONS

MTZ Motortechnische Zeitschrift 56 (1995) pp. 666–673 (Abstract on p. 667).

*Primary Examiner*—Henry C. Yuen
*Assistant Examiner*—Hieu T. Vo
*Attorney, Agent, or Firm*—Evenson, Mckeown, Edwards & Lenahan, P.L.L.C.

[57] ABSTRACT

In a method for setting the output power of an internal combustion engine a resultant specified torque is determined from a driver-intended torque and at least tw o additional intended torques, and the resultant specified torque is set via a apparatus for adjusting torque. Each participant system, in addition to the intended torque, provides information regarding whether the intended constitutes a torque-increase or a torque-decrease. A processing block is provided for each participant system in which the particular intended torque is compared with the driver-intended torque and the resulting specified torque of the preceding participant system. From this, a resulting specified torque is determined. The priority of the particular torque requirement results from the sequence of the participant systems during processing.

5 Claims, 2 Drawing Sheets

METHOD FOR CONTROLLING THE OUTPUT POWER OF AN INTERNAL COMBUSTION ENGINE

BACKGROUND AND SUMMARY OF THE INVENTION

This application claims the priority of 198 03 387.7, filed Jan. 29, 1998, the disclosure of which is expressly incorporated by reference herein.

The invention relates to a method for controlling the output power of an internal combustion engine in a motor vehicle.

A type of motor control (applicant's so-called ME 1.0) is disclosed in MTZ Motortechnische Zeitschrift 56 (1995) 11, pages 666 ff. In this article, the specifications of many vehicle systems of the internal combustion engine are carried on a so-called CAN bus to the motor controll system, where the resultant torque requirement is determined. Via a second segment of the motor control system (the torque adjustment segment, for example), various operating parameters of the internal combustion engine are then set or adjusted so as to establish the resultant required torque.

It is an object of the present invention to provide an improved method for establishing the output power of an internal combustion engine such that changes in existing processes or the adoption of new functionalities can be easily performed.

This and other objects and advantages are achieved by the method according to the invention by obtaining a driver-intended torque from a driver's command, with additional intended torques also being generated by at least two vehicle systems of a motor control system which affects the output torque. A resultant specified torque is determined from the driver-intended torque and the at least two additional intended torques, and the resultant specified torque is set via a torque setting apparatus.

A system utilizing the method according to the invention possesses an advantage over conventional torque interfaces because all functions are based on a common physical factor, preferably the crankshaft torque. Previous systems resorted to obtaining torque requirements directly from the various actuators in the vehicle. On the other hand, in the method according to the invention the torque requirements generated by all vehicle systems are first coordinated, and only then are they established via a common motor control/regulation system. As a result, changes in the existing vehicle systems, as well as the addition of new systems, are considerably simplified. Independence from the type of motor controls and internal combustion engines involved also proves advantageous.

DETAILED DESCRIPTION OF THE DRAWINGS

Figure 1:
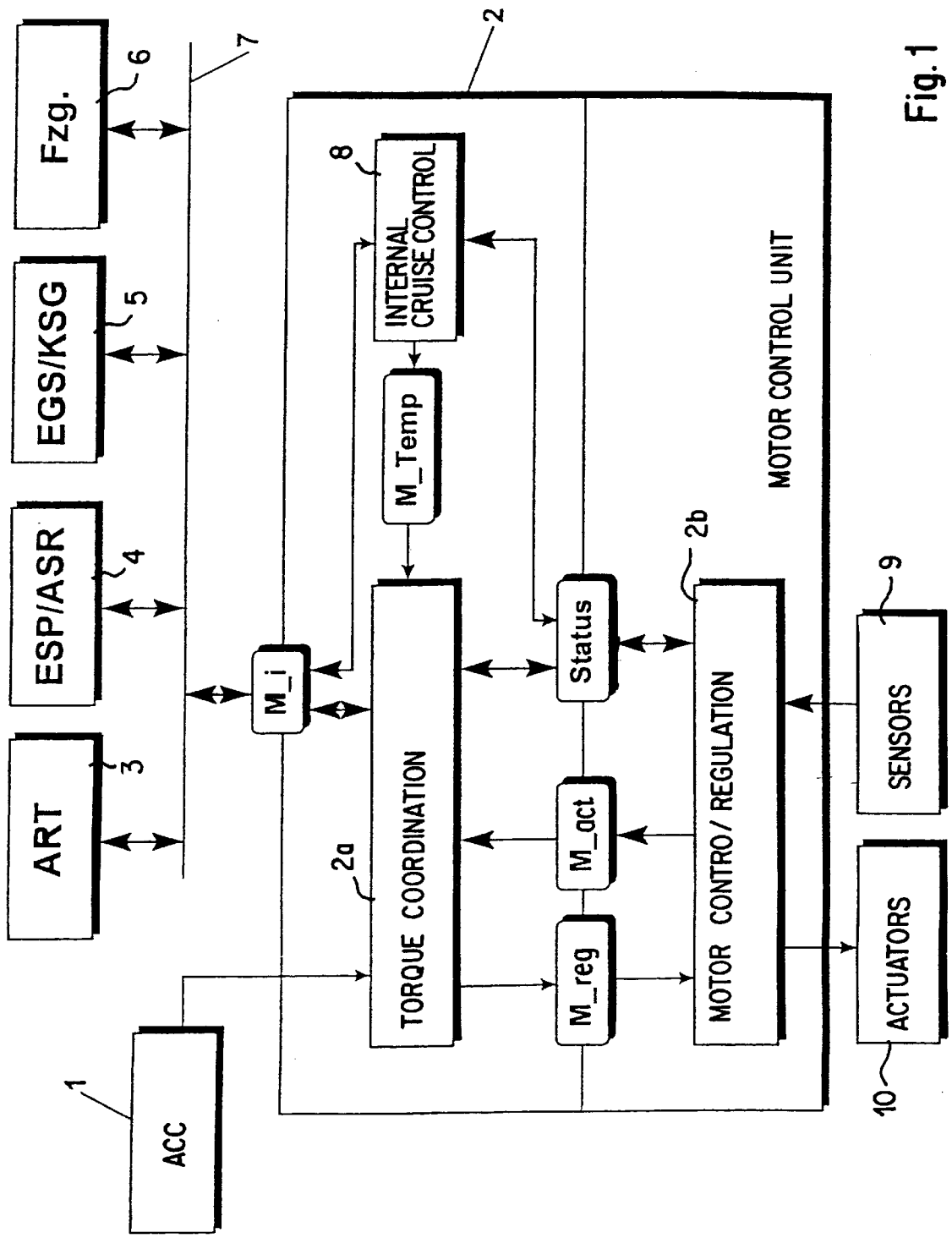
FIG. 1 is a flow chart of a torque interface.

FIG. 1 shows an overview of the controls and functions which cooperate with the drive train of a motor vehicle. The driver signals his intent, in the form of a driver-intended torque M_ACC, to the control device (generally indicated at 2), via the accelerator pedal ACC and a corresponding evaluation logic 1. Additional desired torques M_i are communicated by various vehicles systems 3–6 through a standard interface, the so-called CAN bus 7, to the motor control timer 2. The vehicle systems are, for example, a proximity-controlled cruise control 3, dynamic drive control systems 4 or transmission controls 5. Furthermore, the motor control device 2 also permits an exchange of information with additional vehicle systems 6, via the CAN bus 7. However, use of the CAN bus 7 as an interface is not required. For example, the transmission control 5 can also be integrated into the motor control device 2. The exchanged torque inputs M_i are based on a physical value, preferably the crankshaft torque.

The motor control device 2 is divided into two function blocks, torque coordination 2a and motor control/regulation 2b. At a minimum, the torque coordinator 2a must necessarily be included in the control device 2. The torque coordinator 2a processes and prioritizes the driver-intended torque M_ACC, the external specified torques M_i, and the requirements M_Temp of an internal cruise control 8 which is functionally associated with the torque coordinator 2a. However, it is possible to locate the cruise control 8 in a separate apparatus.

The required torque M_reg resulting from the torque coordination 2a, is input to the motor control/regulation 2b, which in turn reports the actual torque M_act and its status back to the torque coordinator 2a. The motor control/regulation device 2b converts the required torque M_reg to actuating signals for controlling actuators 10, making an allowance for the state of operation of the motor which is reported from sensors 9. In a diesel motor, the control signals include, for example, the position of the throttle valve, the amount of fuel injected and the ignition angle.

Figure 2:
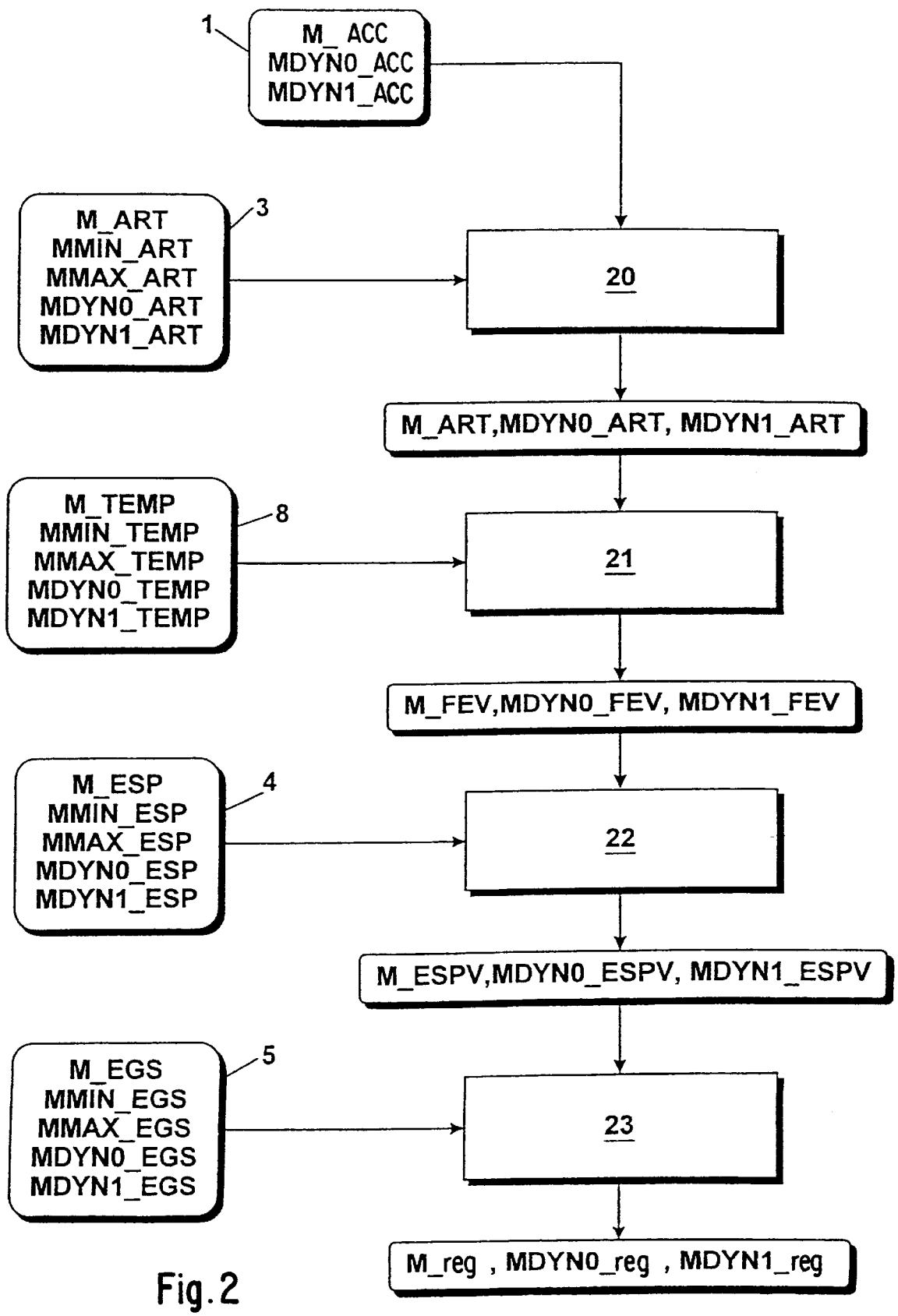
FIG. 2 illustrates the manner in which the process of the invention for torque coordination operates.

The principle of operation of the torque coordinator 2a is shown in FIG. 2. The current driver-intended torque M_ACC is determined by the accelerator pedal position and the current motor speed in an evaluation logic 1, and this information is transferred to the torque coordinator 2a. In addition, the evaluating logic 1 provides information regarding the dynamics with which the torque setting is to occur, in the form of two so-called dynamic bits (MDYN0_ACC and MDYN1_ACC). Accordingly, a desired torque M_i and two dynamic bits MDYN0_i and MDYN1_i are prepared and transferred to the torque coordinator 2a. Furthermore, the participant systems 3–6 and 8 also provide information concerning whether the desired torque M-i is a torque-increasing or torque decreasing torque, and send it to the torque coordinator 2a in the form of two additional bits (MMIN_i and MMAX_i).

In the torque coordinator 2a there are separate coordination blocks 20–23 for each participant system. In general, the prioritization of the input torques M_i and of the dynamic bits MDYN0_i and MDYN1_i is performed by the sequence of the signal processing, with driver-intended torque M_ACC having the lowest priority, and the transmission demand MEGS having the highest priority, as shown in FIG. 2. The resultant dynamic bits are obtained (with the aid of bits MMIN_i and MMAX_i) from the driver-intended torque M_ACC and the resultant specified torque of the preceeding vehicle system, and from the dynamic bits MDYN0_ACC and MDYN1_ACC and the resultant dynamic bits MDYN0_i and MDYN1_i of the preceeding vehicle system. The precise operation of the coordination blocks 20–23 will be explained further below.

The function of the dynamic bits MDYN0_i and MDYN1_i will now be described using an Otto-cycle motor as an example. In Otto-cycle motors, demanded is torque achieved in different ways, preferably via the air route and through action on the ignition. A fuel shut-off would also be theoretically possible. The particular desired kind of torque adjustment is defined through the two dynamic bits MDYN0_i and MDYN1_i:

| Torque setting | MDYN1_i | MDYN0_i |
|---|---|---|
| Optimum efficiency torque setting via the air path | 0 | 0 |
| Quickest possible torque setting via ignition angle and air path | 0 | 1 |
| Torque set value for the air path is frozen, torque reduction is performed by adjusting ignition angle | 1 | 0 |
| Invalid combination | 1 | 1 |

If, for example, the driver-intended torque is to be performed by an optimum-efficiency torque setting, the following dynamic bits are transferred by the evaluation logic 1 to the coordination block 20:

| MDYN0 ACC : = 0 | MDYN1 ACC: = 0 |
|---|---|

During normal operation of the proximity-controlled cruise control and the internal valve timer 8, an optimum efficiency torque setting is made:

| MDYN0_ART: = 0 | MDYN1_ART: = 0 |
|---|---|
| MDYN0_TEMP: = 0 | MDYN1_TEMP : = 0 |

In certain conditions of operation, however, it is possible for the proximity-controlled cruise control to change over to the quickest possible setting of the torque:

| MDYN0_ART : = 1 | MDYN1_ART : = 0 |
|---|---|

In the case of the driving dynamic control systems 4, in normal operation the quickest possible setting of the torque is preestablished:

| MDYN0_ESP : = 1 | MDYN1_ESP : = 0 |
|---|---|

In certain conditions of operation, however, it is possible to change over to a torque setting provided that

| MDYN0_ESP : = 0 | MDYN1_ESP : = 1 |
|---|---|

In the case of shifting actions, the transmission controls 5 need the quickest possible torque setting:

| MDYN0_EGS : = 1 | MDYN1_EGS : = 0 |
|---|---|

Under certain conditions of operation (for example, in the ase of torque limiting in starting procedures) ann optimum efficiency torque setting is given:

| MDYN0_EGS : = 0 | MDYN1_EGS : = 0 |
|---|---|

Naturally, the presets referred to are only examples of an embodiment. Other presets can be made, or in some cases other torque setting options for the dynamic bits MDYN0_i and MDYN1_i are defined. Moreover, the invention is not limited to the series of vehicle systems 3–6 and 8 shown in the embodiment. The precise function of the coordination blocks 20–23 with its input and output signals is generally shown in valid form in the following table:

| Resulting Values | | Allocation | Condition |
|---|---|---|---|
| M_OUT | | M_IN1 | NMIN-IN2 = 1 and |
| MDYN0_OUT | : = | MDYN0_IN1 | MMAX_IN2 = 0 |
| MDYN1_OUT | | MDYN1_IN1 | |
| | | M_IN1 | MMIN_IN2 = 1 and |
| | : = | MDYN0_IN1 | MMAX_IN2 = 0 and |
| | | MDYN1_IN1 | M_IN2 > M_IN1 |
| | | M_IN2 | MMIN_IN2 = 0 and |
| | : = | MDYN0_IN2 | MMXA_IN2 = 0 and |
| | | MDYN1_IN2 | M_IN2 ≦ M_IN1 |
| | | M_IN1 | MMIN_IN2 = 0 and |
| | : = | MDYN0_IN1 | MMAX_IN2 = 1 and |
| | | MDYN1_IN1 | M-IN2 < M_IN1 |
| | | M_IN2 | MMIN_IN2 = 0 and |
| | : = | MDYN0_IN2 | MMAX_IN2 = 1 and |
| | | MDYN1_IN2 | M_IN2 ≧ M_IN1 |
| | | M_IN2 | MMIN_IN2 = 1 and |
| | : = | MDYN0_IN2 | MMAX_IN2 = 1 and |
| | | MDYN1_IN2 | |

In each coordination block the signals of the evaluation logic 1 and the output signals, (symbol OUT) of the preceeding coordination block 20–22 are present at the input 1 (symbol IN1), while the signals of the function to be coordinated i.e., participant systems 3–6 and 8 (are) present at the input 2 (symbol IN2). The output in each case is the resulting specified torque M_OUT and the resultant dynamic bits MDYN0_OUT and MDYN1_OUT. The output values of the last coordination block 23 are then transferred to the motor control/regulator 2b as the resultant specified torque M_nom, and the resultant dynamic bits MDYN0_nom and MDYN1_nom.

The function of the torque coordination 2a is explained again below, based on the example of the coordination block 23. At the input 1 are the resultant values of the preceeding coordination block 22, (i.e., M_ESPV, MDYN0_ESPV and MDYN1_ESPV. At input 2 are the values of the transmission control 5 (i.e., M_EGS, MMIN_EGS, MMAX_EGS and MDYN0_EGS and MDYN1_EGS). The signals of the two inputs are used to determine a resultant specified torque M_reg and resultant dynamic bits MDYN0_reg and MDYN1_reg, and transfer them to the motor control/regulator 2b.

If an assumumption is made that the transmission control 5, under the actual conditions of operation, requires a reduction of the output torque to a given specified torque M_EGS, then the following values would be transferred by the transmission control 5 to the coordination block 23:
M_IN2:=M_EGS
MMIN_EGS:=1

MMAX_EGS:=0
MDYN0_IN2:=MDYN0_EGS
MDYN1_N2:=MDYN1_EGS

Furthermore, the following values are made available at input 1 by the preceding coordination block 22:

M_IN1:=M_ESPV
MNDYN0_IN1:=MDYN0_ESPV
MDYN1_IN1:=MDYN1_ESPV

Under these circumstances, there are two possibilities for determining the output values. In the first case, the specified torque M_EGS is greater than the resultant specified torque M_ESPV resulting from the coordination block 22, i.e., M_IN2>M_IN1. As a result, the conditions which are listed in the second line of the above table are satisfied. For this reason the values of Input 1 are forwarded as output values:

M_reg:=M_OUT:=M_IN1:=M_ESPV
MDYN0_reg:=MNDYN0_OUT:=MNDYN0_IN1:=MDYN0_ESPV
MDYN1_reg:=MDYN1_OUT:=MDYN1_IN1:=MDYN1_ESPV In the second case, the specified torque M_EGS is less than the resultant specified torque M_ESPV from the coordination block 22, i.e., M_IN2≦M_IN1. As a result, the conditions which are listed in the third line of the above table are satisfied. For this reason, the values from input 2 are forwarded as output values:

M_reg:=M_OUT:=M_IN2:=M_EGS
MDYN0_reg:=MDYN0_OUT:=MDYN0_IN2:=MDYN0_EGS
MDYN1_reg:=MDYN1_OUT:=MDYN1_IN2:=MDYN1_EGS Accordingly, the output values for all conditions of operation and for all coordination blocks 20–23 are derived from the above table. In the example shown, the prioritization of the individual vehicle systems is apparent from the order of processing. When the transmission control 5 calls for a torque reduction, the resultant specified torque M_reg becomes either the specified torque M_EGS of the transmission control 5 itself, or else a resultant specified torque M_ESPV is generated as the output value. This occurs, however, only if the resultant specified torque M_ESPV is still less than the specified torque M_EGS.

The system utilizing the method according to the invention possesses an advantage over conventional torque interfaces because all functions are based on a common physical factor, preferably the crankshaft torque. Previous systems resorted to obtaining torque requirements directly from the various actuators in the engine of the vehicle. On the other hand, in the method according to the invention all the torque specifications are first coordinated, and only then are they set via a common valve timer/regulator. As a result, both changes in the existing systems, as well as the adoption of new systems are considerably simplified.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for setting an output power of an internal combustion engine in a motor vehicle, comprising the steps of:

obtaining a driver-intended torque from a driver's command;

providing respective vehicle system intended torque values from at least two vehicle systems which affect output torque of the internal combustion engine;

determining a resultant specified torque from the driver-intended torque and at least two vehicle system intended torques; and setting the resultant specified torque via a torque setting apparatus; wherein each vehicle system generates, in addition to a vehicle system intended torque value, a report regarding whether said vehicle system intended torque value constitutes a torque increase or a torque decrease;

each vehicle system is associated with a coordination block which receives one of a resultant specified torque from a preceding coordination block and the driver-intended torque as a first input, and a vehicle system intended torque from an associated vehicle system as a second input;

in each coordination block a particular vehicle system intended torque value is compared with one of a resultant specified torque from a preceding coordination block and the driver-intended torque, and depending on whether a torque increase or torque decrease is determined, a higher or lower of the first and second input torque is advanced to a next succeeding participant system or to a torque setting apparatus as the resultant specified torque;

the participant system having a lowest priority is output as a first participant system and the participant system having a highest priority is output as a last participant system.

2. The method according to claim 1, wherein participant systems comprise and are prioritized in the following order:

proximity-controlled cruise control, valve timer, running dynamic control and transmission control, respectively.

3. The method according to claim 1, further comprising the steps of:

preparing via each participant system additional data which represents dynamic information for setting the intended torque; and setting the intended torque based on the additional data by controlling at least one of an air path, ignition angle and fuel shut-off.

4. The method according to claim 3, wherein the dynamic information is prepared via two dynamic bits, in each coordination block new resultant dynamic bits are determined from dynamic bits of a current participant system and resultant dynamic bits of a previous coordination block.

5. The method according to claim 4, wherein whenever a torque increase or torque decrease is reported in a particular participant system, if a resultant participant system intended torque of a previous participant system is greater than a participant system intended torque of the current participant system or the dynamic bits of the current participant system, or if the resultant participant system intended torque of the previous participant system is lower than the participant system intended torque of the current participant system, the new resultant dynamic bits of the previous participant system are forwarded as new dynamic bits to the next participant system) and the torque apparatus setting, respectively.

* * * * *